(12) United States Patent
Yahr

(10) Patent No.: US 6,241,880 B1
(45) Date of Patent: Jun. 5, 2001

(54) SELF-CLEANING FAUCET FILTER

(76) Inventor: James Yahr, 2739 Mackinnon Ranch Rd., Cardiff, CA (US) 92007

( * ) Notice: Subject to any disclaimer, the term of this patent is extended or adjusted under 35 U.S.C. 154(b) by 0 days.

(21) Appl. No.: 09/394,393

(22) Filed: Sep. 13, 1999

(51) Int. Cl.[7] .................................................. B01D 35/147
(52) U.S. Cl. ........................ 210/130; 210/106; 210/433.1; 210/449; 210/497.01; 137/801
(58) Field of Search ................................. 210/106, 130, 210/409, 424, 433.1, 446, 449, 452, 460, 497.01, 132, 434; 137/107, 115.16, 512.15, 521, 801, 624.14

(56) References Cited

U.S. PATENT DOCUMENTS

| | | | |
|---|---|---|---|
| 593,573 | * 11/1897 | Franke et al. | 210/449 |
| 1,261,439 | * 4/1918 | Richards | 210/449 |
| 2,014,063 | * 9/1935 | Brady et al. | 210/106 |
| 4,604,202 | * 8/1986 | Movshovitz | 210/449 |
| 4,949,747 | * 8/1990 | Rosenberg | 137/107 |

\* cited by examiner

*Primary Examiner*—Joseph W. Drodge
(74) *Attorney, Agent, or Firm*—Richard Esty Peterson

(57) ABSTRACT

A self-cleaning faucet filter for filtering particulate matter from a water stream, the filter having a housing with a main discharge orifice and a side spout with a flushing water discharge, the housing having a main discharge passage with a filter member and a by-pass discharge passage in the side spout that has a leaf valve that allows water to flow through the by-pass discharge at the beginning and end of water usage with particulate matter accumulated on the filter flowing with the water discharged through the by-pass discharge.

12 Claims, 3 Drawing Sheets

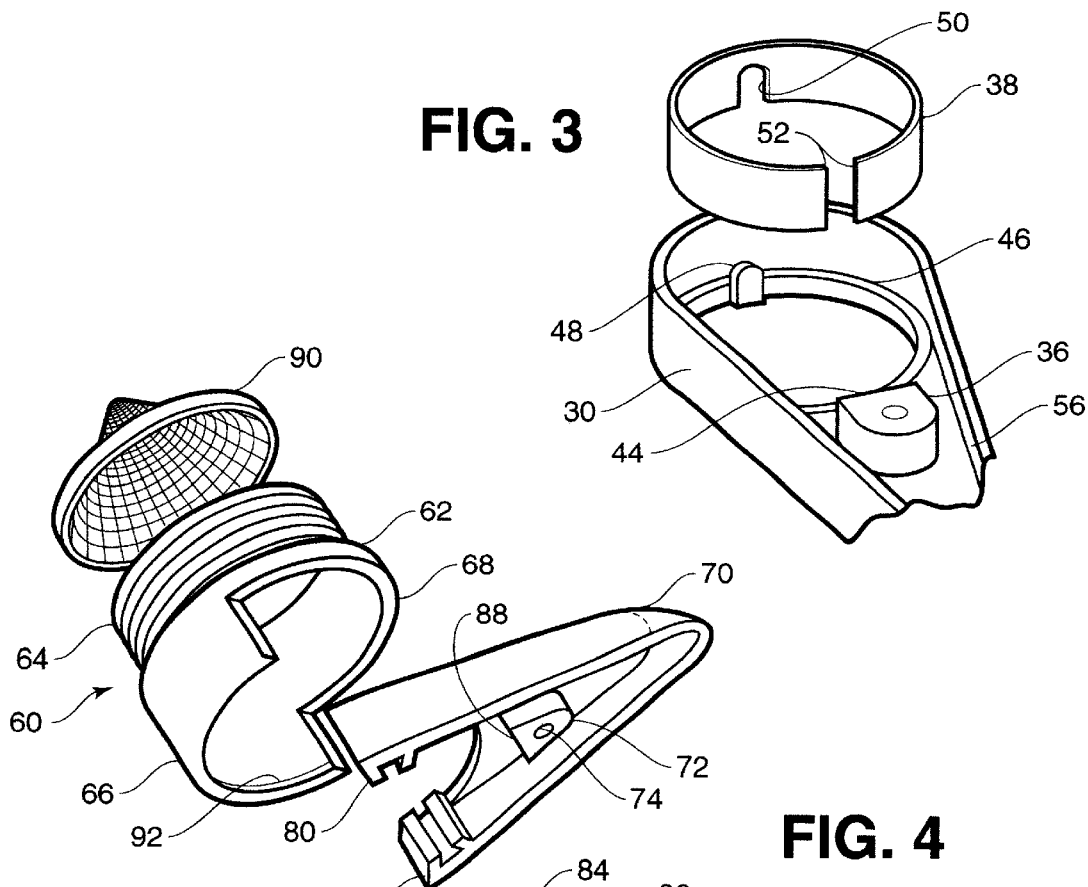
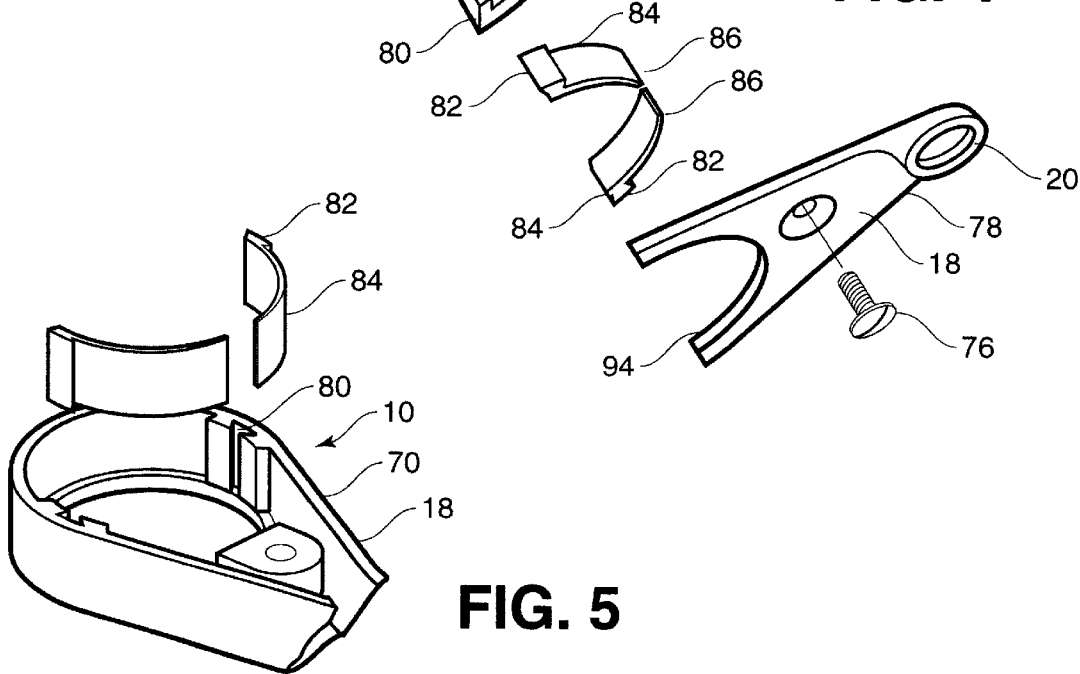

SELF-CLEANING FAUCET FILTER

BACKGROUND OF THE INVENTION

This invention relates to a filter device and in particular to a self-cleaning filter device that is adapted for use on a faucet, particularly a kitchen sink faucet where water is used for cooking and drinking.

The self-cleaning filter device is incorporated into modern faucets by replacing the threaded end orifice or aerator with the modular self-cleaning filter device. The filter device includes a screen-type filter or a porous-type filter commonly made of a ceramic or metal material.

In a conventional filter device, particulate matter is trapped in the surface of the filter unit. The particulate matter either remains on the surface where it accumulates affecting the efficiency of the filter unit to pass water or more disturbing, eventually dissolves and passes as dissolved matter or reduced-size particulate matter. Worse, accumulated particulate matter can provide a bed for propagation of bacteria, mold or other deleterious microbes. Ideally, it would be beneficial to flush the surface of the filter unit after each passage of water. In this manner particulate matter will not accumulate and adversely affect the performance of the filter unit as described above.

It is therefore an object of this invention to provide a filter device that is self-cleaning to prevent the accumulation of particulate matter deposited on the filtering element. Additionally, it is an object of this invention that the self-cleaning filter device operate automatically, and at least one before or after water passes through the filter device.

In accordance with this invention, a filter device has been devised that is automatically self-cleaning and provides a flushing action over the surface of the filtering element of the filtering unit both before and after water passes through the unit. The filter device is primarily adapted for use as a water filter for a faucet, but can be adapted for other uses where the flushing fluid is disposable or returnable to a fluid reservoir.

SUMMARY OF THE INVENTION

The filter device of this invention is a self-cleaning liquid filter that automatically flushes the filtering element of a filter unit in the filter device. The filter device can be used in any liquid system where it is desirable to filter a liquid stream using a portion of the liquid stream as a flushing medium. The liquid system should include a means, such as a return conduit, to return the flushing medium to the liquid source or alternately a discharge conduit for delivering the flushing medium to a disposal means such as a drain.

The preferred use for the self-cleaning filter device is a faucet filter where the water used for flushing the filtering element of the filter unit is shunted to the sink for disposal down the drain.

The self-cleaning faucet filter of the preferred embodiment comprises a filter device in modular form that includes an integral threaded connector and is adapted to replace the aerator unit or end nozzle of a conventional modern faucet. The modular filter device includes a housing with a main passage for filtered water to pass and a by-pass passage for shunting flushing water to a side discharge spout. Between the passages is a spring-biased flap valve which closes under pressure of the flowing water. The spring bias is preferably provided by the flap element which functions both as a closure flap and as a leaf spring to resist closure, and return the flap valve to an open position when the pressure is removed.

With the by-pass passage sized as a fraction of the main passage, water initially flows over and around the filter unit and out the open by-pass passage as pressure increases from zero on opening the faucet valve to the discharge pressure through the filter unit. As pressure begins to build, the flap valve closes, directing all flow through the main passage, through the filter unit and out the faucet for use.

In a reverse manner as the faucet valve is turned off, the water pressure falls off and at some point impedance to flow caused by the filter unit is greater than the bias of the flap element. The flap valve opens, allowing a charge of water to pass over and around the filter unit to exit the by-pass passage before water flow ceases altogether.

In this manner the filter unit is flushed before and after a water discharge from the faucet. Any accumulated particulate matter is flushed from the filtering element of the filter unit to the by-pass passage.

As noted, the by-pass passage can be connected to a hose or other type of conduit for remote disposal or return to the fluid source, which is practical for fuel and other valuable fluids. However, in the preferred embodiment as a faucet filter the self-cleaning filter device simply has a by-pass discharge in the form of a side spout to shunt the flushing water to the side of the main water flow for disposal down the sink drain.

Other features, advantages, and objects of the present invention will become apparent with reference to the following description and accompanying drawings.

BRIEF DESCRIPTION OF DRAWINGS

FIG. 3 is an enlarged view detailing the valve member of the faucet filter of FIG. 2.

FIG. 4 is an exploded, perspective view of an alternate embodiment of the faucet filter.

FIG. 5 is an enlarged, partial view detailing the valve seating? in the embodiment of FIG. 4.

DETAILED DESCRIPTION OF THE PREFERRED EMBODIMENTS

Figure 1:
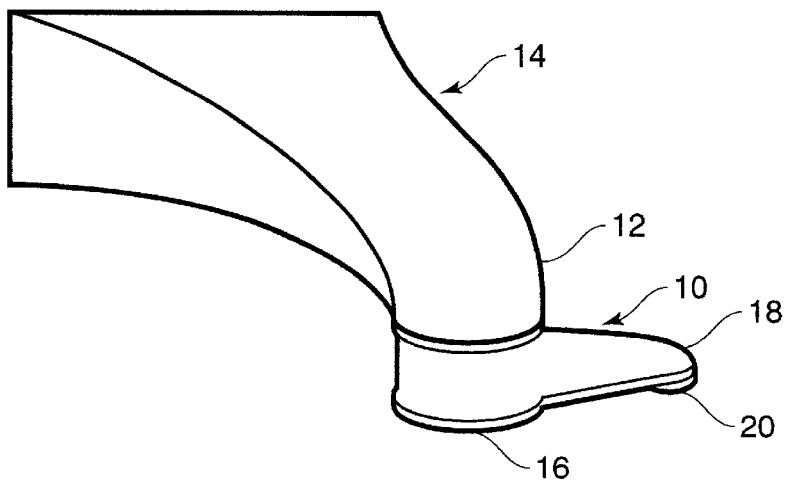
FIG. 1 is a perspective view of the self-cleaning faucet filter mounted on the spout of a typical faucet.

The self-cleaning faucet filter of this invention is shown in FIG. 1 and designated generally by the reference numeral 10. The self-cleaning faucet filter 10 is attached to a conventional spout 12 of a sink faucet 14 shown only in part in FIG. 1. The faucet filter 10 is a filter device that with modification can be used in other applications. In its principal designed use as a filter device for a water faucet where water is drawn for drinking and cooking, the filter device in the form of a faucet filter is attachable to a faucet spout 12 by replacing the conventional threaded aerator. The faucet filter 10 as shown in FIG. 1 has a main discharge orifice 16 through which filtered water is discharged for use. Additionally, the faucet filter 10 has a side spout 18 with a by-pass discharge 20 through which flushing water is discharged at the beginning and end of each water use. The side spout 10 is arranged either to the side of the water spout 12 or if desired can be turned toward the back of the water spout depending on the user's preference. The side spout provides an extension for discharging any flushing water away from the main orifice 16 so that a user will not collect discharged water during use when collecting water discharged from the main orifice 16. Alternately, the side spout is truncated or replaced with one or more openings at the side of the main chamber for discharge of the flushing water at the beginning and end of each water use with the user simply avoiding collecting discharged water during such times.

Figure 2:
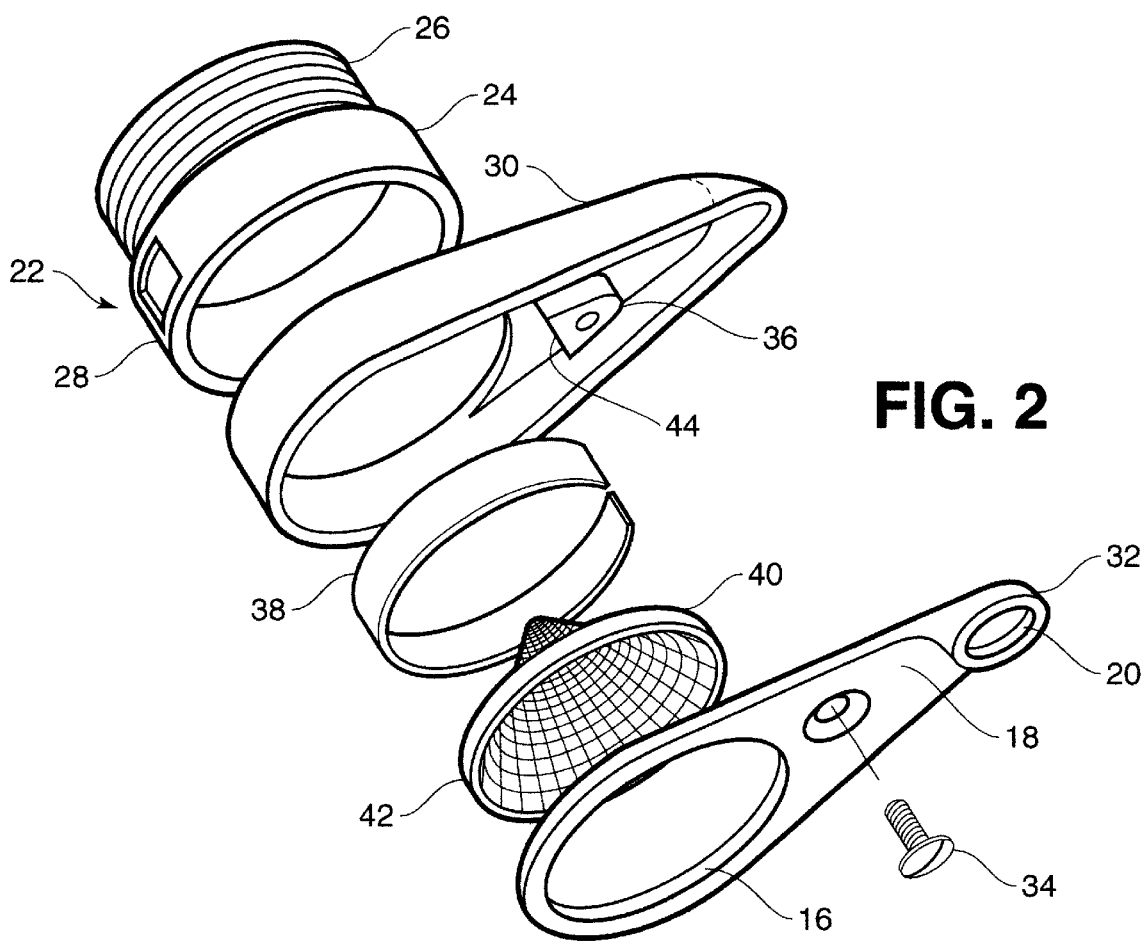
FIG. 2 is an exploded view of a first embodiment of the self-cleaning faucet filter.

The self-cleaning faucet filter 10 can be constructed in different ways to provide a simple module that is easily attached to the threaded spout of a modern faucet. In a first embodiment shown in FIG. 2, the faucet filter 10 is shown as a first embodiment assembly 22 in an exploded view with a faucet coupler 24 having a threaded portion 26 and a mounting portion 28 for connection of a housing top 30 that is preferably fixed to the coupler 24 by welding or brazing so that the housing top is permanently assembled to the coupler 24. The housing top 30 is connected to a housing bottom 32 by a screw 34 that fastens the housing bottom 32 to the top 30 by connecting to a threaded stud 36 in the housing top. The housing top and bottom when connected form an internal chamber in which is mounted a leaf valve 38 and a filter 40. In the preferred embodiment, the filter is conical in shape to cause any surface particles to sluff to the perimeter 42 where they can be flushed by the passage of water to the discharge 20 of the spout 18. In operation, the stud 36 has a valve face 44 that functions as a valve seat for the leaf valve 38.

Figure 6:
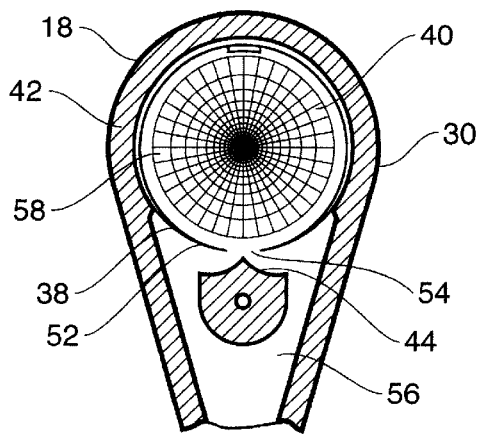
FIG. 6 is a cross-sectional view of the valve arrangement of the embodiment of FIG. 2.

Referring to the inverted view of the housing top 30 in FIG. 3, a perimeter seat 46 has a key 48 which engages a notch 50 in the leaf valve 38 when the leaf valve is seated in the housing top 30. The leaf valve 38 has two opposed ends 52 which function as flap valves against the face 44 of the stud 36 when the leaf valve 38 is deformed by pressure of water flowing to the discharge orifice 16. As can be seen with reference to FIG. 6, when the leaf valve 38 is seated in the housing top 30 water flows to the filter 40 where it meets some resistance causing a slight pressure rise to force the opposed ends 52 against the surface 44 of the stud 36. Prior to this occurring, water first passes in an unrestricted manner through passage 54 between the leaf valve ends 52 and the surface 44 of the stud 36. From this passage the flushing water flows through the by-pass passage 56 in the spout 18 for discharge through the by-pass discharge 20.

Similarly, when water passing through the filter member 40 with the by-pass passage 54 closed by the ends 52 of the leaf valve 38 being in contact with the stud surface 44, and the water tap is turned off, pressure of the water through the filter diminishes until the point is reached where the valve ends 52 return to their pre-flexed position opening the passage 52 and allowing a portion of the flushing water over the filter 40 to pass to the passage 56. In this manner both at the start and the finish of tap usage, the inner surface 58 of the filter 40 is flushed of debris that collects on filter rim 42 for discharge through the passage 54 where it is shunted by the spout 18 to the discharge 20 away from the main stream of water flow.

Figure 7:
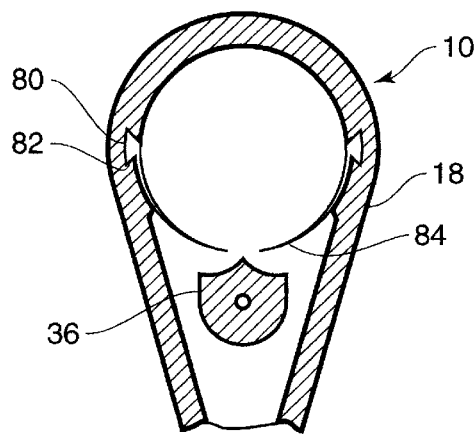
FIG. 7 is a partial, cross-sectional view of the valve arrangement of the embodiment of FIG. 4.

Referring to FIG. 4, a second embodiment assembly 60 is shown. In this embodiment, a coupler 62 that is connectable to the faucet 14 as shown in FIG. 1 includes a threaded portion 64 and a mounting portion 66 with a cut-out section 68 into which a housing top 70 is seated and joined by welding, brazing or other fabrication processed to permanently fix the housing top 70 to the coupler 62. Depending on fabrication cost, using tube stock and cast pieces, the alternate construction as shown in FIG. 4 is included to disclose the alternate constructions available for a filter device usable for a faucet filter. The housing top 70 includes a stud 72 with a threaded hole 74 that is engaged by a screw 76 to fasten a housing bottom 78 to the housing top 70. In the assembly 60 of FIG. 4, housing top 70 has a pair of opposed mounting key ways 80 into which the mounting ends 82 of a pair of leaf valves 84 are seated. The leaf valves 84 have ends 86 which on flexure of the leaf valves 84 contact the seating surface 88 of the stud 72. This arrangement is also shown in FIGS. 5 and 7 with the leaf valves 84 acting as a flap valve in the same manner as the single valve member 88 of FIGS. 2 and 3.

In the embodiment of FIG. 4, the filter 90 is installed through the open end of the coupler 64 to seat on the inner rim 92 of the coupler 62 and the edge 94 of the housing bottom 78. In operation, the second embodiment assembly 60 operates identical to the embodiment of FIG. 2 with a flushing water being discharged from the discharge 20 of the side spout 18 at the beginning and end of a water usage.

Figure 8:
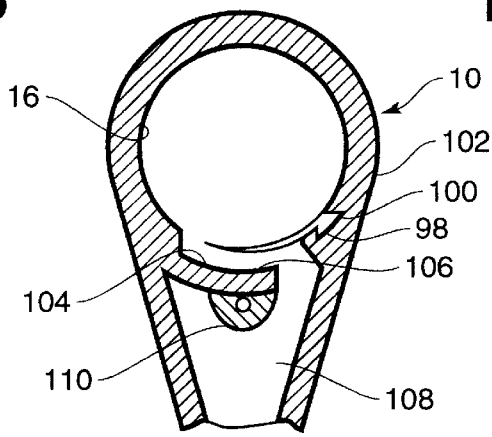
FIG. 8 is a partial cross-sectional view of an alternate embodiment of the valve arrangement for a faucet filter of the type disclosed.
Figure 9:
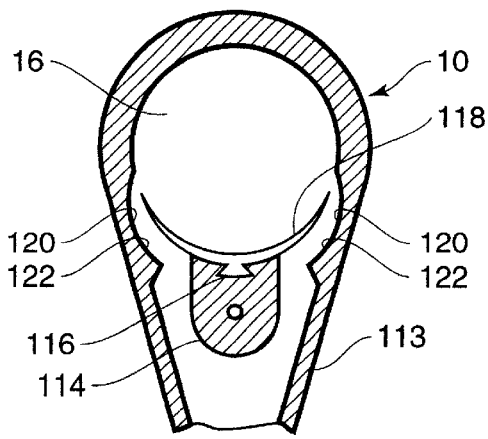
FIG. 9 is a further alternate embodiment of a valve arrangement for a faucet filter of the type disclosed.
Figure 10:
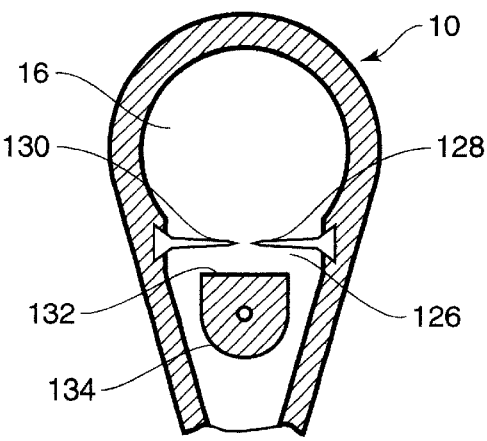
FIG. 10 is a cross-sectional view of a further embodiment of a valve arrangement for a faucet filter of the type disclosed.

With reference to FIGS. 8 to 10, alternate versions of the faucet filter 10 are shown. In these versions the structure appears essentially the same as for FIGS. 1 and 2 with a difference in the valving system, particularly the valve element that controls the flushing water passage to the flushing water discharge.

For example, in FIG. 8 a single leaf valve 96 has a key mount 98 that engages a keyway 100 to secure the flexible valve member to the housing 102. The leaf valve 96 on sensing pressure in the main orifice 16 is flexed to contact a fixed finger member 104 to close the passage 106 allowing by-pass of water to the discharge passage 108. The finger member 104 can include a protrusion 110 with a threaded hole 112 for mounting the housing bottom (not shown).

In FIG. 9, the housing top 113 has an inner connection boss 114 with a keyway on which is mounted a leaf valve 116 having valve elements 118 that are contactable with a seating surface 120 that is formed in the housing 16. Between the valve element 118 and the seating surface 120 is a passageway 122 for flushing water at the start and stop of each use of the faucet. In operation the structure of the alternate embodiment of FIG. 9 operates identically to those embodiments previously described.

In FIG. 10, the faucet filter 10 has a main discharge orifice 16 with a by-pass passage 126 between two oppositely mounted leaf members 128 that are simply constructed straight members with ends 130 that flex against a stud 134 to close the passageway 126 to the flushing water discharge (not shown).

It is to be understood that both the faucet filter housing and the valve members can be made out of a variety of different materials. However for drinking water systems it is preferred that the components be fabricated from a non-toxic material such as stainless steel or plastic.

Also, the filter 40 is alternately a screen-type filter or a porous ceramic or metal type filter and is preferably conical in shape with the apex directed into the incoming flow. The by-pass discharge passage and leaf valve are positioned at the base of the conical filter so collected particulate matter is discharged through the constricted opening to the discharge passage when the leaf valve is open at the beginning and end of water flow.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A self-cleaning filter device for filtering particulate matter from liquid in a liquid stream which has a flow that periodically starts and stops, the filter device comprising:
   a housing having an intake passage interposed in the liquid stream, wherein the liquid stream is directed to flow into the intake passage;
   a main discharge passage in the housing communicating with the intake passage, the main discharge passage having a main discharge;
   a filter member mounted in the housing between the intake passage and the discharge passage, the filter member having an intake side and a discharge side;
   a by-pass discharge passage in the housing communicating with the intake passage and main discharge passage, the by-pass discharge passage having an opening proximate the filter member communicating with the intake passage on the intake side of the filter member;
   a valve at the opening of the by-pass discharge passage, wherein the valve has a valve member that closes the by-pass discharge passage at the beginning of liquid flow through the main discharge passage and opens the by-pass discharge passage at the end of liquid flow through the main discharge passage, wherein the by-pass discharge passage has a discharge and at the beginning and end of liquid flow through the main discharge passage, a portion of the liquid flow into the intake passage that does not flow through the filter member, flows through the by-pass discharge passage to the by-pass and wherein the valve member comprises a leaf valve, and wherein the housing includes a valve seat, wherein the leaf valve contacts the valve seat and closes the by-pass discharge passage in the manner of a flap valve.

2. The self-cleaning filter device of claim 1 wherein the liquid stream flow is contained in a faucet with an end for liquid discharge, and the housing has a connector portion for connecting the self-cleaning filter device to the end of the faucet.

3. The self-cleaning filter device of claim 1 wherein the housing has a side spout containing the by-pass passage with the discharge of the by-pass passage located at an end of the spout displaced from the main discharge.

4. The self-cleaning filter device of claim 1 wherein the filter member has a conical configuration.

5. The self-cleaning filter device of claim 4 wherein the housing has an inner rim and the filter member has a perimeter rim that seats on the inner rim of the housing.

6. A self-cleaning filter device for a water faucet having a discharge orifice for flowing water, the filter device comprising:
   a filter housing having a coupler that connects the filter device to the discharge orifice of the faucet;
   a chamber in the housing with a main discharge passage with a main discharge, and a by-pass discharge passage with a by-pass discharge;
   a filter member seated in the housing across the main discharge passage, wherein water flowing from the discharge orifice flows through the filter member before flowing through the main discharge;
   a pressure sensitive valve member in the chamber of the housing at the by-pass discharge passage the valve member being biased to open the by-pass discharge passage to the chamber when there is little or no water pressure in the chamber and close the by-pass discharge passage to the chamber when water pressure increases in the chamber and water flows through the filter element, wherein when the by-pass discharge passage is open, water flows through the discharge passage instead of through the filter member, and wherein the valve member comprises a leaf element and a seat element wherein the leaf element contacts the seat element on closing the by-pass discharge passage.

7. The self-cleaning filter device of claim 6 wherein the filter member has a chamber side and a main discharge side, and the by-pass discharge passage is proximate the filter member on the chamber side of the filter member.

8. The self-cleaning filter device of claim 6 wherein the valve member includes a plurality of leaf elements and seat elements.

9. The self-cleaning filter device of claim 6 wherein the leaf element is connected to the housing and the seat element comprises a part of the housing.

10. The self-cleaning filter device of claim 9 wherein the leaf element has a pair of flap members engageable with the seat element.

11. The self-cleaning filter device of claim 6 wherein the housing includes a side spout and the by-pass discharge passage is contained within the side spout.

12. The self-cleaning filter device of claim 6 wherein the filter member is conical with a base rim and a surface wherein the filter member is oriented in the chamber to cause matter accumulating on the surface of the filter member to pass through the valve member to the by-pass discharge passage on beginning and ending water flow through the filter member.

* * * * *